(12) United States Patent
Goto et al.

(10) Patent No.: US 7,639,278 B2
(45) Date of Patent: Dec. 29, 2009

(54) IMAGE SUPPLY DEVICE, RECORDING SYSTEM, AND CONTROL METHOD THEREFOR

(75) Inventors: Fumihiro Goto, Kawasaki (JP); Kazuya Sakamoto, Yokohama (JP); Takao Aichi, Tokyo (JP); Kentaro Yano, Yokohama (JP); Kazuyuki Masumoto, Yokohama (JP); Akitoshi Yamada, Yokohama (JP); Ruriko Mikami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 935 days.

(21) Appl. No.: 10/541,383

(22) PCT Filed: Jan. 29, 2004

(86) PCT No.: PCT/JP2004/000856

§ 371 (c)(1),
(2), (4) Date: Jul. 1, 2005

(87) PCT Pub. No.: WO2004/068335

PCT Pub. Date: Aug. 12, 2004

(65) Prior Publication Data

US 2006/0098938 A1    May 11, 2006

(30) Foreign Application Priority Data

Jan. 31, 2003 (JP) ............... 2003-024542
Jan. 23, 2004 (JP) ............... 2004-015522

(51) Int. Cl.
*H04N 5/225* (2006.01)
*H04N 9/04* (2006.01)

(52) U.S. Cl. ............... 348/207.2; 348/207.99

(58) Field of Classification Search .......... None
See application file for complete search history.

(56) References Cited

U.S. PATENT DOCUMENTS 5,541,656 A    7/1996    Kare et al. ............ 348/334

(Continued)

FOREIGN PATENT DOCUMENTS

CA    2235567    10/1998

(Continued)

OTHER PUBLICATIONS

Japanese Office Action issued Feb. 6, 2009, in Japanese Application No. 2004-015522.

(Continued)

*Primary Examiner*—Justin P Misleh
(74) *Attorney, Agent, or Firm*—Fitzpatrick, Cella, Harper & Scinto

(57) ABSTRACT

When a digital camera and printer are directly connected via a communication interface, and a recording process in the printer is interrupted while transmitting image data from the camera to the printer and recording the image data, the camera designates the restart of the recording process and it is determined whether the printer is of a type capable of restarting the recording process. In a case where the printer is determined to be the type capable of restarting the recording process and a DPOF (digital print order format) file is being printed, the DPOF file is resent to designate printing from a page next to the printed page. In a mode in which image data are sequentially transmitted to the printer and printed, a print process of image data subsequent to the printed image data is designated.

9 Claims, 14 Drawing Sheets

U.S. PATENT DOCUMENTS

| | | | | |
|---|---|---|---|---|
| 6,000,864 | A | 12/1999 | Hanada | 400/62 |
| 6,055,361 | A | 4/2000 | Fujita et al. | 358/1.15 |
| 6,298,405 | B1 | 10/2001 | Ito et al. | 710/107 |
| 6,464,317 | B2 * | 10/2002 | Miyazawa | 347/14 |
| 6,806,978 | B1 | 10/2004 | Tamura et al. | 358/1.15 |
| 7,286,251 | B2 * | 10/2007 | Tomida et al. | 358/1.15 |
| 7,327,482 | B2 * | 2/2008 | Ferlitsch | 358/1.15 |
| 7,415,287 | B2 | 8/2008 | Ueno | 455/557 |
| 2001/0047443 | A1 | 11/2001 | Ito et al. | 710/107 |
| 2001/0048534 | A1 | 12/2001 | Tanaka et al. | 358/1.16 |
| 2002/0060810 | A1 | 5/2002 | Shiraiwa | 358/1.16 |
| 2002/0089688 | A1 | 7/2002 | Ferlitsch et al. | 358/1.15 |
| 2003/0067620 | A1 | 4/2003 | Masumoto et al. | 358/1.13 |
| 2003/0112356 | A1 | 6/2003 | No et al. | 348/333.01 |
| 2003/0156196 | A1 | 8/2003 | Kato et al. | 348/207.2 |
| 2004/0021902 | A1 | 2/2004 | Ogiwara et al. | 358/1.15 |
| 2004/0046990 | A1 | 3/2004 | Yano et al. | 358/1.15 |
| 2004/0070672 | A1 | 4/2004 | Iwami et al. | 348/207.2 |
| 2004/0252335 | A1 | 12/2004 | Yano et al. | 358/1.15 |
| 2005/0190265 | A1 | 9/2005 | Small | 348/207.2 |
| 2006/0125867 | A1 | 6/2006 | Sakuda et al. | 347/19 |

FOREIGN PATENT DOCUMENTS

| | | | |
|---|---|---|---|
| EP | 0 874 519 A2 | | 10/1998 |
| EP | 938218 A2 | | 8/1999 |
| EP | 1 005 199 A1 | | 5/2000 |
| JP | 10-229538 | | 8/1998 |
| JP | 10250190 A | * | 9/1998 |
| JP | 11-7701 | | 1/1999 |
| JP | 11298831 A | * | 10/1999 |
| JP | 2001-290612 | | 10/2001 |
| JP | 2002-19235 | | 1/2002 |
| JP | 2002-63129 | | 2/2002 |
| JP | 2002-190877 | | 7/2002 |
| JP | 2003-341183 | | 12/2003 |
| RU | 2187146 C2 | | 8/2002 |
| WO | WO 2004/009362 A1 | | 1/2004 |

OTHER PUBLICATIONS

Official Letter/Search Report, issued by the European Patent Office, on Apr. 22, 2008, in European Patent Application No. 04706293.0.

Apr. 16, 2007 Russian Notice of Allowance (with English Translation).

Apr. 6, 2004 International Search Report in PCT/JP2004/000856.

Apr. 6, 2004 International Search Report in PCT/JP2004/000804.

Apr. 6, 2004 Written Opinion in PCT/JP2004/000804.

Russian Official Action with English Translation.

White Paper of CIPA DC-001-2003, Digital Photo Solutions for Imaging Devices, Camera & Imaging Products Association, Feb. 3, 2003.

Photographic and Imaging Manufacturers Association, Inc., PIMA 15740:2000, Approved Jul. 5, 2000, $1^{st}$ Edition, "Photography—Electronic Still Picture Imaging—Picture Transport Protocol (PTP) for Digital Still Photography Devices" (2000).

Japanese Office Action dated Sep. 26, 2008, in Japanese Application No. 2004-008401.

Russian Official Action with English Translation, (Sep. 28, 2006).

* cited by examiner

FIG. 7

```
<startJob>
  <jobConfig>
    <quality>50000000</quality>                          — 700
    <paperSize>51060000</paperSize>                      — 701
    <paperType>52020000</paperType>                      — 702
    <fileType>53000000</fileType>                        — 703
    <datePrint>54010000</datePrint>                      — 704
    <fileNamePrint>55000000</fileNamePrint>              — 705
    <imageOptimize>56000000</imageOptimize>              — 706
    <fixedSize>58030000</fixedSize>                      — 707
    <cropping>59000000</cropping>                        — 708
  </jobConfig>
  <printInfo>
    <fileId>00000001</fileId>                            — 709
    <date>2002/10/28</date>                              — 710
  </printInfo>
</startJob>
```

720 — jobConfig block (700–708)
721 — printInfo block (709–710)

FIG. 8A

| prtPID | ImagePath | copyID | progress | Image Printed |
|---|---|---|---|---|

FIG. 8B

| dpsPrint ServiceStatus | jobEnd Reason | error Status | error Reason | disconnect Enable | Capability Changed | newJobOK |
|---|---|---|---|---|---|---|

IMAGE SUPPLY DEVICE, RECORDING SYSTEM, AND CONTROL METHOD THEREFOR

TECHNICAL FIELD

The present invention relates to an image supply device such as a digital camera, a recording system, and a control method therefor.

BACKGROUND ART

In recent years, digital cameras (image sensing devices) which can sense images and convert them into digital image data by simple operations have been prevalent. When an image sensed by such a camera is printed and used as a photo, it is a common practice to temporarily download the sensed digital image data from a digital camera to a PC (computer), execute an image process by the PC, and output the processed image data from the PC to a color printer, thus printing an image.

By contrast, for example, a color print system which allows a digital camera to directly transfer digital image data to a color printer without the intervention of any PC and can print it out, a so-called photo-direct (PD) printer which mounts a memory card that is used in a digital camera and stores sensed images and prints sensed images stored in the memory card has recently been developed.

Particularly, in order to directly transfer image data from a digital camera to a printer and print the image data, demands have arisen for standardization of interface specifications between a digital camera of each manufacturer and a printer, the operation method, and the like. One proposal for standardization is a guideline for realizing a DPS (Direct Print System).

However, in a case where a print process is interrupted by disconnecting a cable connecting a digital camera and a printer, or by turning off the printer, during printing of image data from a digital camera, details of restarting the print process by the printer are not defined. The present invention, therefore, proposes a method of realizing this.

DISCLOSURE OF INVENTION

The present invention has been made in consideration of the above situation, and has as its feature to provide an image supply device capable of increasing the process efficiency in restarting an interrupted recording process, a recording system, and a control method therefor.

According to the present invention, there is provided with an image supply device used in a recording system in which the image supply device and a recording apparatus are directly connected via a communication interface, and image data is transmitted from the image supply device to the recording apparatus and recorded, characterized by comprising: determination means for determining whether the type of recording apparatus that is used is a type capable of restarting recording in a case where a recording process by the recording apparatus is interrupted; instruction means for instructing the recording apparatus to restart recording in a case where the determination means determines that the type of the recording apparatus is the type capable of restarting recording process; and control means for controlling the image supply device to designate recording subsequent to interruption of the recording process to record the image data in a case where the instruction means instructs the restart of recording process.

Further, according to the present invention, there is provided a method of recording with a recording system in which an image supply device and a recording apparatus are directly connected via a communication interface, and image data is transmitted from the image supply device to the recording apparatus and recorded, the method comprising the steps of: determining whether the type of recording apparatus is a type capable of restarting recording in a case where a recording process by the recording apparatus is interrupted, instructing, by the image supply device, the recording apparatus so as to restart the recording process, in a case where the type of the recording apparatus is determined to be the type capable of restarting recording process, and instructing, by the image supply device, the recording apparatus on recording subsequent to the recorded image data together with the recording restart instruction.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the descriptions, serve to explain the principle of the invention.

FIG. 7 depicts a view for explaining an example of a print start command issued by the DSC according to the first embodiment;

FIGS. 8A and 8B depict views for explaining JobStatus and DeviceStatus according to the embodiment;

BEST MODE OF CARRYING OUT THE INVENTION

Preferred embodiments of the present invention will now be described in detail below with reference to the accompanying drawings.

Figure 1:
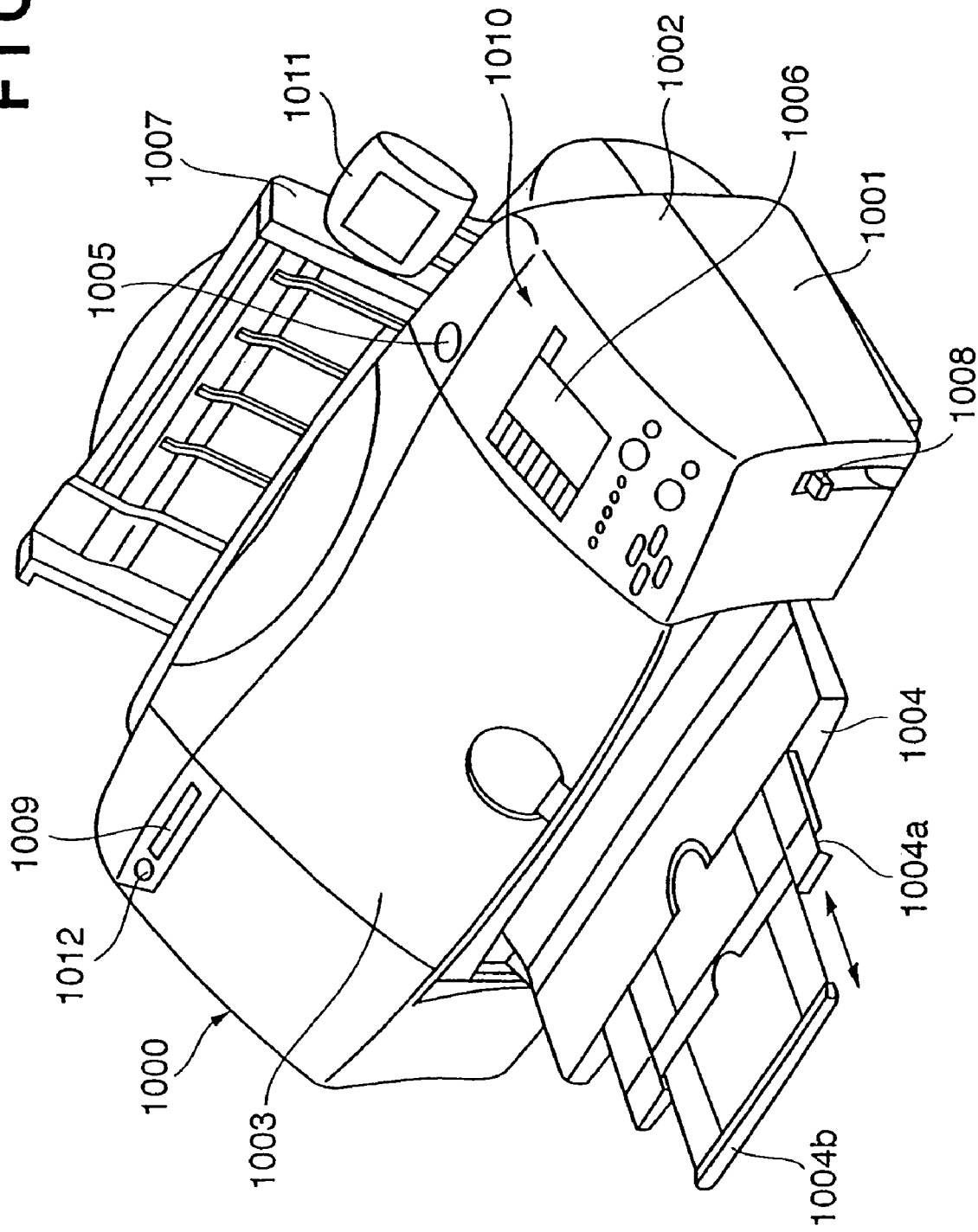
FIG. 1 depicts a schematic perspective view of a PD printer according to an embodiment of the present invention.

FIG. 1 depicts a schematic perspective view of a photo direct printer (to be referred to as a PD printer hereinafter) 1000 according to an embodiment of the present invention. The PD printer 1000 has a function of receiving data from a host computer (PC) and printing the data as a general PC printer, and a function of directly reading and printing image data stored in a storage medium such as a memory card, or receiving image data from a digital camera and printing the data.

Referring to FIG. 1, a main body that forms the housing of the PD printer 1000 according to the embodiment has a lower case 1001, an upper case 1002, an access cover 1003, and an exhaust tray 1004 as exterior members. The lower case 1001 nearly forms the lower half portion of the PD printer 1000, and the upper case 1002 nearly forms the upper half portion of the main body. These cases are combined to form a hollow structure having a storage space which stores mechanisms that will be described later. Openings are respectively formed in the upper and front surfaces of the main body. One end of the exhaust tray 1004 is rotatably held by the lower case 1001, and rotation of the tray 1004 opens/closes the opening formed in the front surface of the lower case 1001. In executing a print operation, the exhaust tray 1004 is rotated toward the front surface side to open the opening. Print sheets can be exhausted from the opening, and sequentially stacked on the exhaust tray 1004. The exhaust tray 1004 stores two auxiliary trays 1004a and 1004b. If necessary, the auxiliary trays 1004a and 1004b can be pulled out to enlarge/reduce the loading area of print sheets in three steps.

One end of the access cover 1003 is rotatably held by the upper case 1002 so as to be able to open/close the opening formed in the upper surface. By opening the access cover 1003, a printhead cartridge (not shown), the ink tank (not shown), or the like stored in the main body can be exchanged. Although not shown, when the access cover 1003 is opened/closed, a projection formed on the rear surface of the cover 1003 rotates a cover open/close lever. The open/close state of the access cover 1003 can be detected by detecting the rotation position of the lever by a microswitch or the like.

A power key 1005 is arranged on the upper surface of the upper case 1002. A control panel 1010 which comprises a liquid crystal display unit 1006, various key switches, and the like is provided on the right side of the upper case 1002. The structure of the control panel 1010 will be described in detail later with reference to FIG. 2. Reference numeral 1007 denotes an automatic feeder which automatically feeds a print sheet into the apparatus main body. Reference numeral 1008 denotes a paper gap select lever which is used to adjust the gap between the printhead and a print sheet. Reference numeral 1009 denotes a card slot which receives an adapter capable of receiving a memory card. Image data stored in the memory card can be directly read and printed via this adapter. Examples of the memory card (PC) are a compact Flash™ memory card, a smart media card, and a memory stick. Reference numeral 1011 denotes a viewer (liquid crystal display unit) which is detachable from the main body of the PD printer 1000, and is used to display an image for one frame, an index image, or the like when the user wants to search images stored in the PC card for an image to be printed. Reference numeral 1012 denotes a USB terminal which is used to connect a digital camera (to be described later). Also, another USB connector for connecting a personal computer (PC) is provided on the rear surface of the PD printer 1000.

Figure 2:
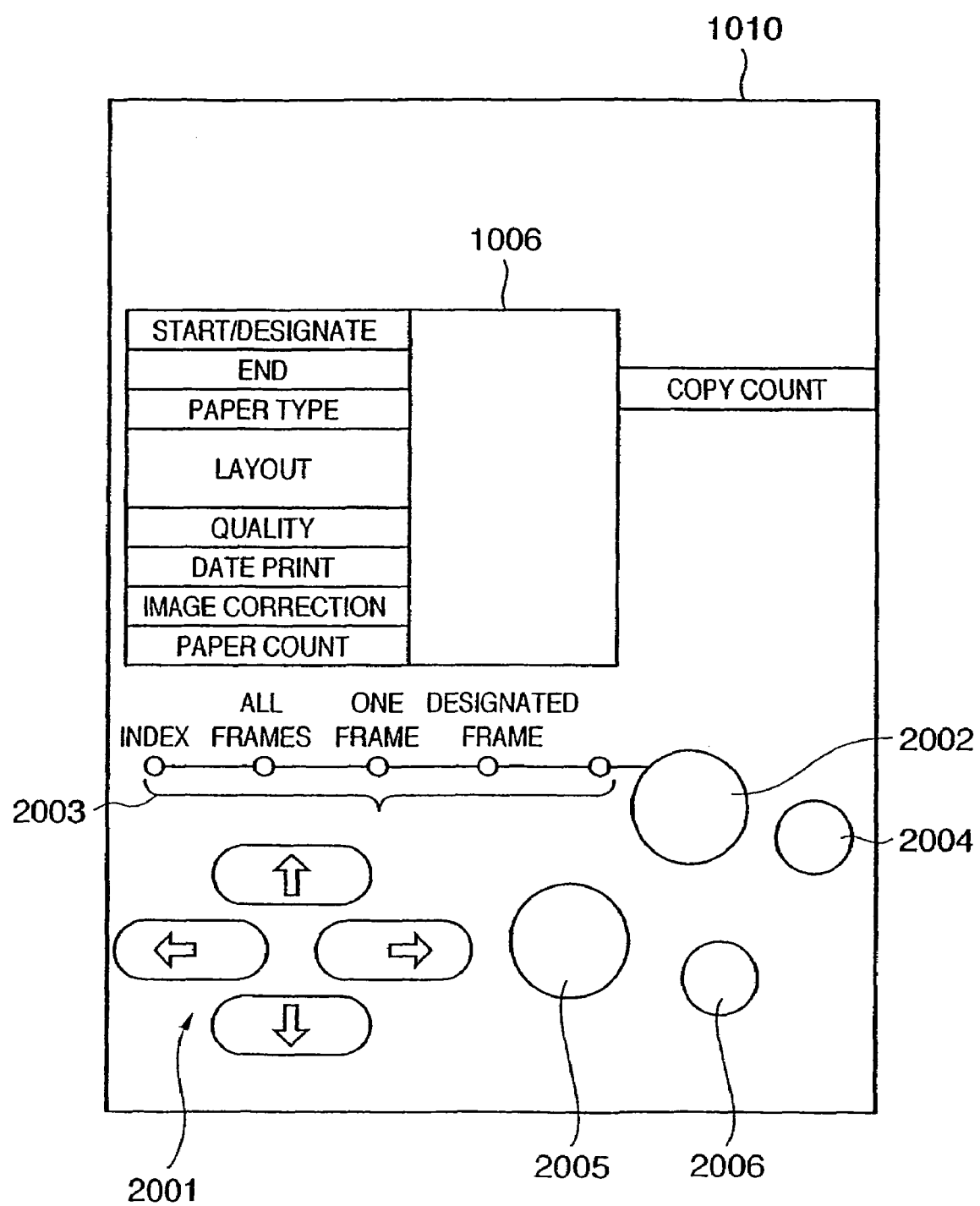
FIG. 2 depicts a schematic view of the control panel of the PD printer according to the embodiment.

FIG. 2 depicts a schematic view of the control panel 1010 of the PD printer 1000 according to the embodiment.

Referring to FIG. 2, the liquid crystal display unit 1006 displays menu items for various setups of data associated with items printed on the right and left sides of the unit 1006. The items displayed in the liquid crystal display unit 1006 include, e.g., the first number or designated frame number of a photo to be printed (start/designate), the final photo number subjected to a printing end operation (end), the number of copies to be printed (copy count), the type of paper sheet (print sheet) used for printing (paper type), the setup of the number of photos to be printed on one paper sheet (layout), the designation of print quality (quality), the designation as to whether or not to print a photographing date (date print), the designation as to whether or not to print a photo after correction (image correction), the display of the number of paper sheets required for printing (paper count), and the like. These items are selected or designated using cursor keys 2001 by a user. Reference numeral 2002 denotes a mode key. Every time the mode key 2002 is pressed, the type of printing (index printing, all-frame printing, one-frame printing, and the like) can be switched, and a corresponding one of LEDs 2003 is turned on in accordance with the selected type of printing. Reference numeral 2004 denotes a maintenance key which is used to perform maintenance of the printer, such as cleaning of the printhead. Reference numeral 2005 denotes a print start key which is pressed when the start of printing is designated or when the maintenance setup is settled. Reference numeral 2006 denotes a print cancel key which is pressed when printing or maintenance is canceled.

Figure 3:
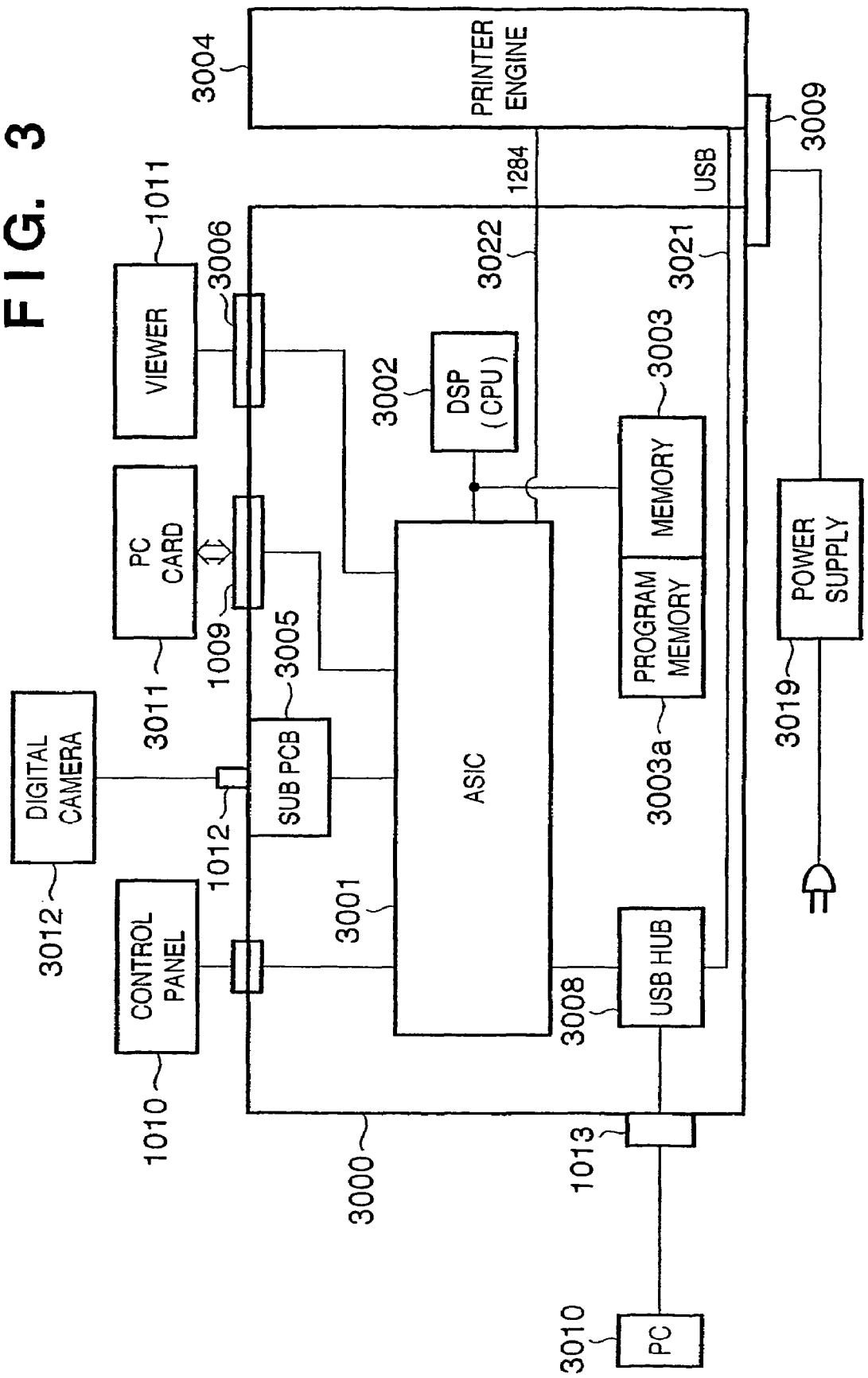
FIG. 3 is a block diagram showing the arrangement of principal part associated with control of the PD printer according to the embodiment.

The arrangement of principal parts associated with control of the PD printer 1000 according to the embodiment will be described below with reference to FIG. 3. In FIG. 3, the same reference numerals as those used in previously-discussed figures denote parts common to those in the above drawings, and a description thereof will be omitted.

Referring to FIG. 3, reference numeral 3000 denotes a controller (control board). Reference numeral 3001 denotes an ASIC (an application specific integrated circuit, e.g., a dedicated custom LSI (large scale integration circuit)). Reference numeral 3002 denotes a DSP (Digital Signal Processor) which incorporates a CPU (central processing unit) and executes various control processes (to be described later), and image processes such as conversion from a luminance signal (RGB) into a density signal (CMYK), scaling, gamma conversion, and error diffusion. Reference numeral 3003 denotes a memory having a program memory 3003a which stores a control program for the CPU of the DSP 3002, a RAM area has a memory area functioning as a work area which stores image data, and the like. Reference numeral 3004 denotes a printer engine. In the embodiment, the printer is equipped with a printer engine for an ink-jet printer which prints a color image by using a plurality of color inks. Reference numeral 3005 denotes a USB connector serving as a port for connecting a digital camera (DSC) 3012. Reference numeral 3006 denotes a connector for connecting the viewer 1011. Reference numeral 3008 denotes a USB hub (USB HUB). When the PD printer 1000 executes printing on the basis of image data from a PC 3010, the USB hub 3008, which is connected to the PC 3010 via an interface 1013, allows data from the PC 3010 to pass through it, and outputs the data to the printer engine 3004 via a USB 3021. The connected PC 3010 can directly exchange data and signals with the printer engine 3004 and execute printing (functions as a general PC printer). Reference numeral 3009 denotes a power supply connector which inputs a DC voltage converted from commercial AC power from a power supply 3019. The PC 3010 is a general personal computer. Reference numeral 3011 denotes a memory card (PC card) mentioned above; and reference numeral 3012 denotes the digital camera (to be also referred to as a DSC: Digital Still Camera).

Note that signals are exchanged between the controller 3000 and the printer engine 3004 via the USB 3021 or an IEEE1284 bus 3022.

Figure 4:
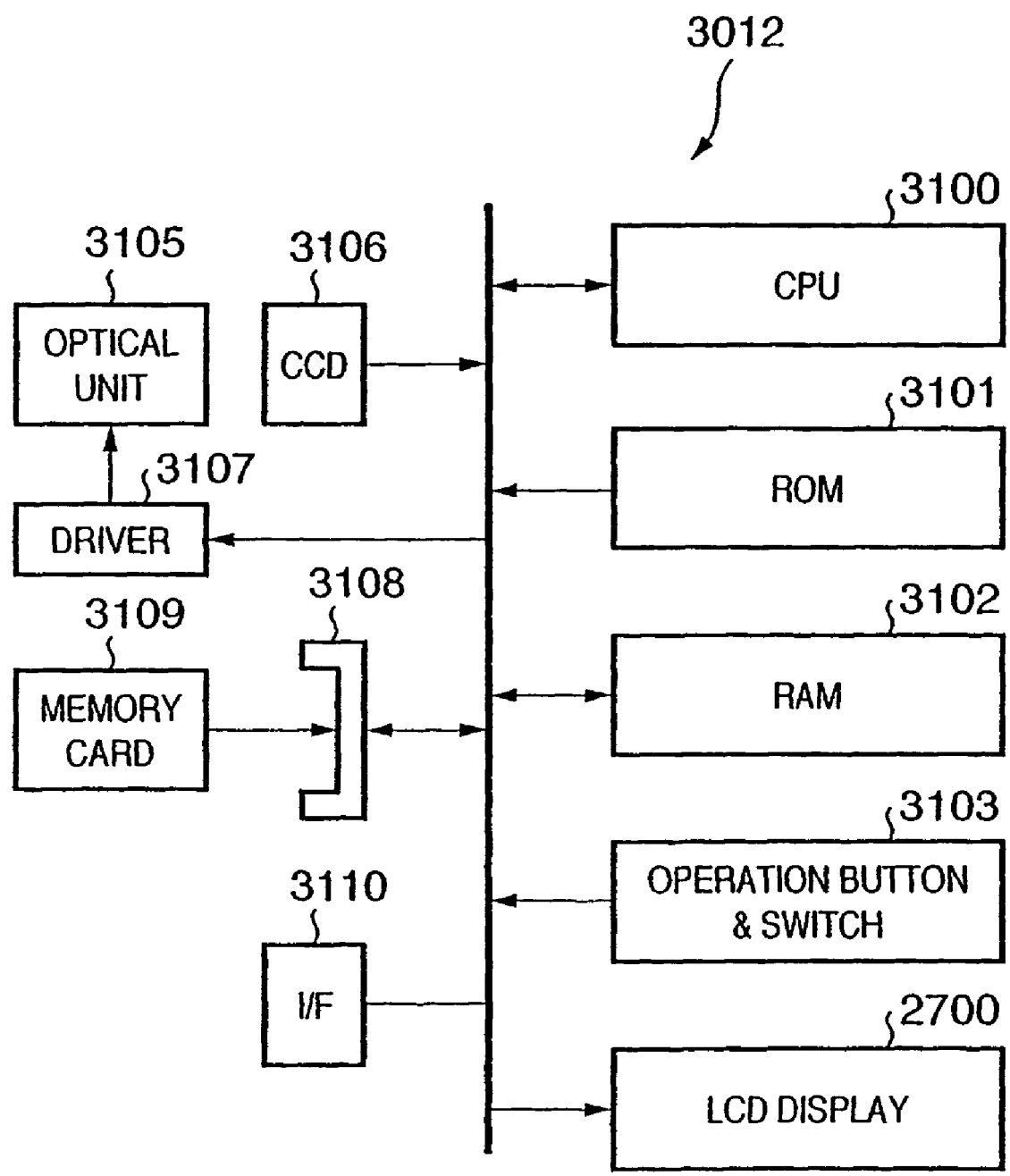
FIG. 4 is a block diagram showing the arrangement of a DSC according to the embodiment.

FIG. 4 is a block diagram showing the arrangement of the DSC (Digital Still Camera) 3012.

Referring to FIG. 4, reference numeral 3100 denotes a CPU which controls the overall DSC 3012; and numeral 3101 denotes a ROM (read only memory) which stores the process sequence (control program) of the CPU 3100. Reference numeral 3102 denotes a RAM (random access memory) which is used as a work area for the CPU 3100; and numeral 3103 denotes a switch group which is used to perform various operations. The switch group 3103 includes various switches, cursor keys, and the like. Reference numeral 2700 denotes a liquid crystal display unit which is used to display an image photographed at present or a sensed/stored image and display a menu for performing various setups to the DSC 3012. Reference numeral 3105 denotes an optical unit which mainly comprises a lens and its drive system. Reference numeral 3106 denotes a CCD element; and numeral 3107 denotes a driver which drives and controls the optical unit 3105 under the control of the CPU 3100. Reference numeral 3108 denotes a connector for connecting a storage medium 3109 (compact Flash™ memory card, smart media card, or the like); and numeral 3110 denotes a USB interface (USB slave side) for connecting a PC or the PD printer 1000 of the embodiment.

Figure 5:
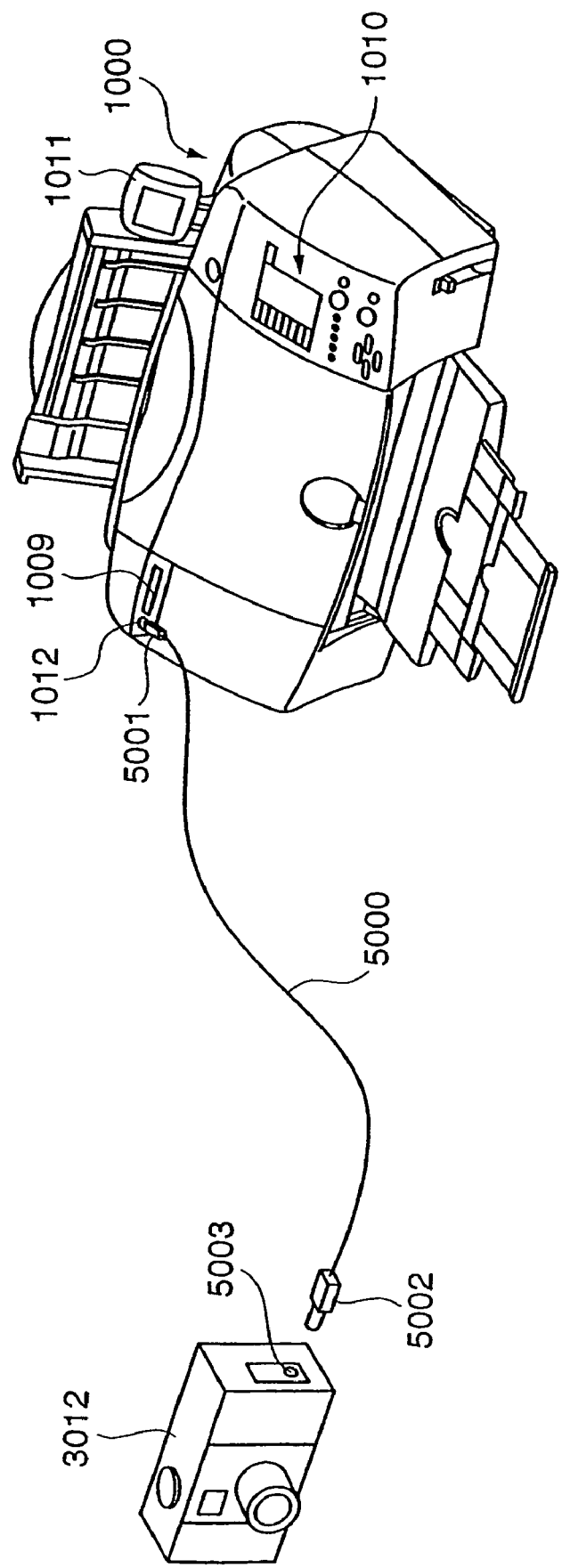
FIG. 5 depicts a view for explaining connection between the PD printer and a digital camera according to the embodiment.

FIG. 5 depicts a view for explaining the connection between the PD printer 1000 and the DSC 3012 according to the embodiment. The same reference numerals as those used in previously-discussed figures denote parts common to those in the above drawings, and a description thereof will be omitted.

Referring to FIG. 5, a cable 5000 comprises a connector 5001 which is connected to the connector 1012 of the PD printer 1000, and a connector 5002 for connecting to a connector 5003 of the digital camera 3012. The digital camera 3012 can output image data saved in an internal memory (memory card) via the connector 5003. The digital camera 3012 can take various arrangements, such as an arrangement which incorporates a memory as a storage means and an arrangement having a slot for inserting a removable memory. The PD printer 1000 and the digital camera 3012 are connected via the cable 5000 shown in FIG. 5, and image data from the digital camera 3012 can be directly sent to the PD printer 100 and printed by the PD printer 1000.

Operation examples of the print system according to the embodiment on the basis of the above arrangement will be explained as embodiments.

First Embodiment

The outline of the operation of a print system including a DSC 3012 and the PD printer 1000 based on the above arrangement will be described. In the print system according to the first embodiment, the DSC 3012 and the PD printer 1000 can operate in accordance with DPS (Direct Print System) specifications.

Figure 6:
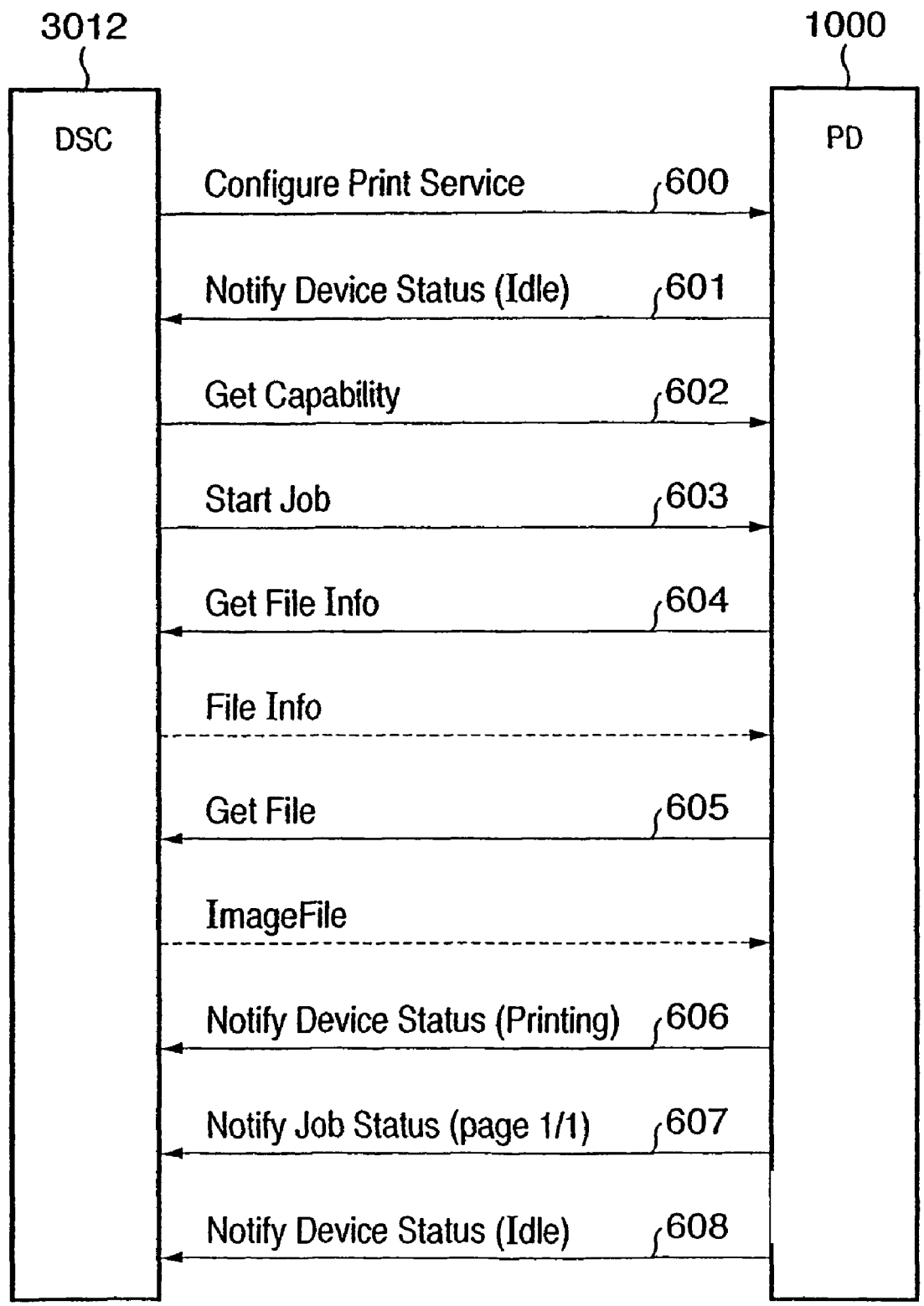
FIG. 6 depicts a chart for explaining command exchange between the PD printer and the DSC in a print system according to a first embodiment.

FIG. 6 depicts a chart for explaining a sequence when the DSC 3012 issues a print request to the PD printer 1000 to print in the print system according to the first embodiment.

This process sequence is executed when the PD printer 1000 and DSC 3012 are connected via a cable 5000 and have confirmed that they comply with the DPS specifications. The DSC 3012 transmits "ConfigurePrintService" to the PD printer 1000 to acquire information about the state of the PD printer 1000 (600). In response to this, the PD printer 1000 notifies the DSC 3012 of the current state (in this case, "idle" state) of the PD printer 1000 (601). The DSC 3012 inquires about the capability of the PD printer 1000 (602), and issues a print start request (StartJob) corresponding to the capability (603). The print start request is issued on the condition that "newJobOK" (FIG. 8B) in the status information (to be described later) from the PD printer 1000 is "True" in 601.

In response to the print start request, the PD printer 1000 requests file information of the DSC 3012 on the basis of the file ID of image data to be printed (604). In response to this, the DSC 3012 transmits file information. The file information contains items of information, such as the file capacity (file size), the presence/absence of a thumbnail image, and file attributes. When the PD printer 1000 receives the file information and determines that the file can be processed, the PD printer 1000 requests the file of the DSC 3012 (605). The DSC 3012 sends image data of the requested file to the DSC 3012. After that operation when the PD printer 1000 starts a print process, the PD printer 1000 sends status information representing a "Printing" operation to the DSC 3012 as denoted by the "NotifyDeviceStatus" information in 606. After a print process of one page ends, the PD printer 1000 notifies the DSC 3012 of the end of the print process by issuing "NotifyJobStatus" information 607 at the start of processing the next page. For printing of only one page, the PD printer 1000 notifies the DSC 3012 of the "idle" state by sending the "NotifyDeviceStatus" information 608 at the end of printing one requested page. For N-up print of laying out a plurality of (N) images on one page and printing them, the PD printer 1000 sends "NotifyJobStatus" information 607 to the DSC 3012 every time N images are printed. The issuing timings of sending of the "NotifyJobStatus" information and the "NotifyDeviceStatus" information and the image data acquisition order in the first embodiment are merely examples, and various cases are conceivable depending on the product specification.

The print process includes a case in which the file IDs of image data to be printed are contained and transmitted at once in a print start request (StartJob) from the DSC 3012 to perform printing, and a case in which only the file ID of a DPOF (digital print order format) file used in general photo development is contained in a print start request (StartJob) from the DSC 3012 and transmitted to the PD printer 1000, and the PD printer 1000 interprets the DPOF file, acquires the file ID of necessary image data, and performs printing.

FIG. 7 depicts a view for explaining an example of a print start request issued by the DSC 3012 to the PD printer 1000.

In FIG. 7, numeral 720 denotes the configuration (jobConfig) of the print job, and numeral 721 denotes print information (printInfo).

The configuration 720 will be explained. Numeral 700 (quality) designates the print quality such as "normal" or "high quality". Numeral 701 (paperSize) designates the paper size, and numeral 702 (paperType) designates the paper type such as "plain paper", "photo paper", or "ink-jet paper". Numeral 703 (fileType) designates the type of an image file to be printed, and when, for example, DPOF is used, the type representing DPOF is designated by the file type 703.

Numeral 704 (datePrint) designates whether or not to print a date, numeral 705 (fileNamePrint) designates whether or not to print a file name, numeral 706 (imageOptimize) designates whether or not to optimize an image, numeral 707 (fixedSize) designates whether or not to perform fixed-size printing, and numeral 708 (cropping) designates whether or not to print a designated range of an image.

The print information 721 contains a file ID 709 (fileId) and date information 710 (date).

FIGS. 8A and 8B depict views for explaining items of information contained in the JobStatus information and the DeviceStatus information described above. The JobStatus information (FIG. 8A) and the DeviceStatus information (FIG. 8B) are transmitted from the PD printer 1000 to the DSC 3012. The DSC 3012 can request the PD printer 1000 to transmit these items of information at an arbitrary timing.

In FIG. 8A, "prtPID", "ImagePath", and "copyID" information become effective when print of a DPOF file is designated. "prtPID" information is identification information (ID) of a print section designated by a DPOF file. "Image-Path" information is information of a path for specifying an image file designated by the DPOF file. "copyID" information designates the number of a copy during printing upon designating print of a plurality of copies. In printing based on a DPOF file, the DSC 3012 describes "fileID" information of the DPOF file in a print start request (StartJob), and transmits the print start request to the PD printer 1000. In response to this, the PD printer 1000 can start printing the DPOF file. The PD printer 1000 acquires the DPOF file on the basis of the "fileID" information of the DPOF file, executes the "GetFileID" operation, and specifies the "fileID" of an image file designated in the DPOF file. The PD printer 1000 requests the image file of the DSC 3012, and acquires the image data. As a result, an image designated in the DPOF file can be printed. During execution of printing based on the DPOF file, the PD printer 1000 notifies the DSC 3012 by the "NotifyJobStatus" information that includes the "prtPID" information, the "ImagePath" information, and the "copyID" information representing the progress of printing. The "prtPID" information, the "ImagePath" information, and the "copyID" information are stored in an internal memory in order to avoid printing the printed images again when the printing is restarted, in a case where it is possible to restart the printing after the printing was interrupted.

When the print process restarts after interruption due to any reason during printing of the DPOF file, the print process restarts from a top of the page at which the print process was aborted.

"progress" information represents the current page (N/T) during printing out of a prospective number of pages. N represents the current print page, and T represents the total number of print pages to be printed. "imagePrinted" information represents the number of printed images.

DeviceStatus information (FIG. 8B) will be explained.

"dpsPrintServiceStatus" information designates the state of the PD printer 1000, and is transmitted to the DSC 3012 from the PD printer 1000. "dpsPrintServiceStatus" information includes idle, print information, and pause states of the printer. "jobEndReason" information designates the end state of a print process, and is transmitted to the DSC 3012 upon the completion of printing the final page. "errorStatus" information represents an error state, and is transmitted upon generation of an error. "errorReason" information represents the cause of generation of the error, and is transmitted together with the "errorStatus" information.

"disconnectEnable" information refers to information indicating that printing is possible even if the USB cable 5000 is disconnected from the PD printer 1000. The PD printer 1000 notifies the DSC 3012 of the "disconnectEnable" information. "capabilityChanged" information refers to information indicating that the capability in the PD printer 1000 has been changed, and is transmitted to the DSC 3012. "newJobOK" information refers to information indicating that the PD printer 1000 can accept a print request, and is transmitted to the DSC 3012.

Figure 9:
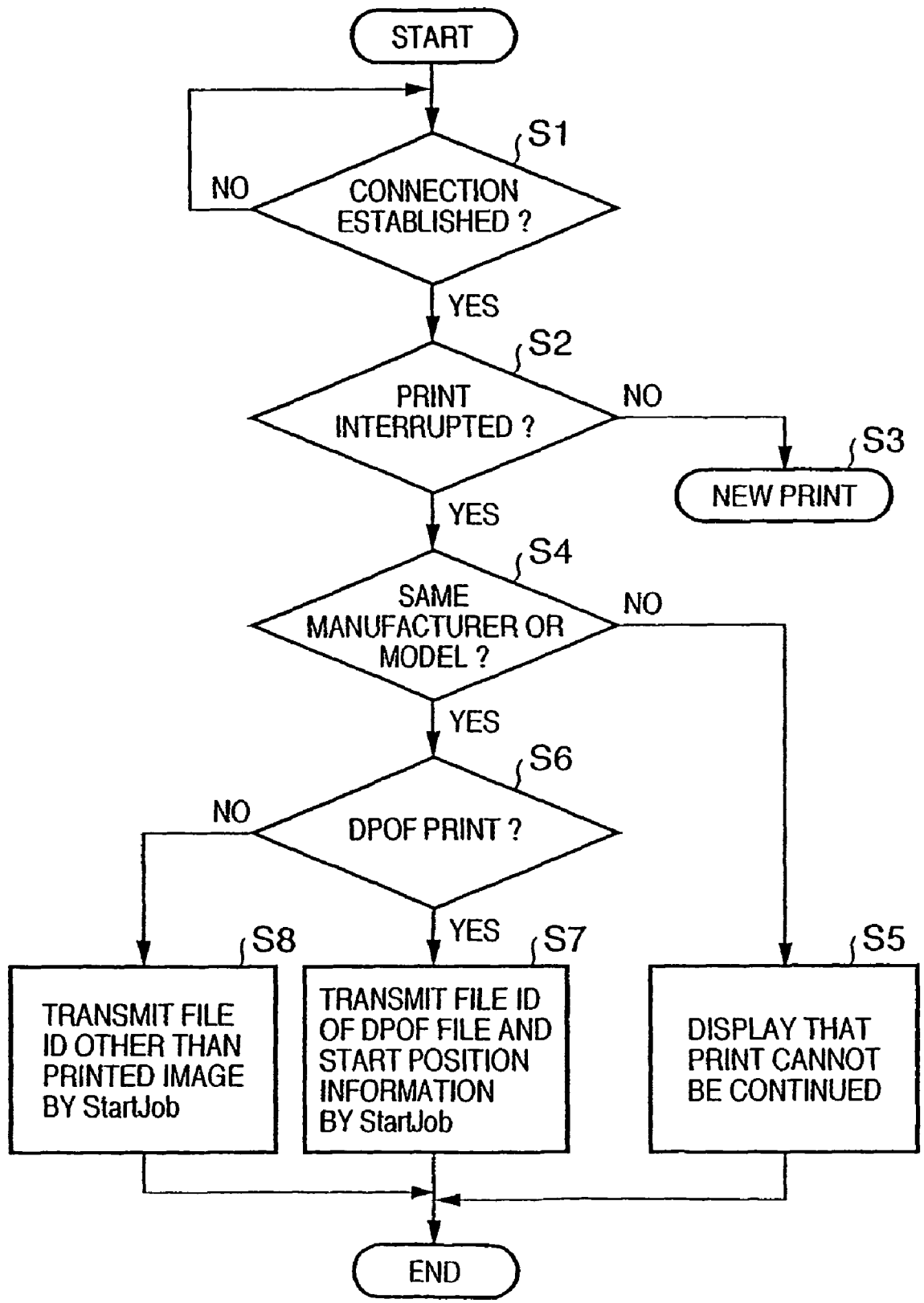
FIG. 9 is a flow chart showing a print restart process by a DSC according to the first embodiment.

FIG. 9 is a flow chart showing a print restart process in the DSC 3012 according to the first embodiment. A program which executes this process is stored in the ROM 3101, and the CPU 3100 executes a control process in accordance with the program to realize the process.

In this process, the print operation is aborted when, e.g., the cable 5000 is disconnected during execution of a print job. After that, DPS reconnection is established, the print button of the DSC 3012 is designated, and the PD printer 1000 is instructed to restart print operation. The PD printer 1000 then restarts printing.

This process assumes that interruption of a print process in the PD printer 1000 and interruption of a print process in the DSC 3012 are recognized by the PD printer 1000 and the DSC 3012.

In step S1, it is determined whether the DSC 3012 and PD printer 1000 have physically been connected by connecting the cable 5000 or the like and DPS reconnection has been established. If the connection is established, the process advances to step S2. If the DSC 3012 designates the restart of print, it is determined whether the print process has been interrupted. If the print process has not interrupted, the process advances to step S3 to perform a normal print process, such as a process of newly starting the print process in accordance with a print instruction.

If the print process has been interrupted, the process advances to step S4. It is determined whether the PD printer 1000 which has the newly established connection is of the same model (same <dpsVersion> and <productName>), a model of the same manufacturer (<productName>), or a model of the same vendor (<vendorName>) as that of the PD printer 1000 which has interrupted the previous print process. In this procedure, the model of the PD printer 1000 is determined on the basis of the contents of information sent as a response from the PD printer 1000 for "ConfigurePrintService" information issued by the DSC 3012. When the same PD printer is reconnected, no problem occurs. Even for a printer of another model, if the manufacturer or vendor of the printer is the same and a re-print process according to the first embodiment is possible on the basis of the design of the manufacturer or vendor, restart of printing can be determined to be possible, and the process advances to a subsequent process S6. If NO in step S4, the process advances to step S5 to determine that continuation of print process is impossible, and display a message on the display unit 2700 of the DSC 3012. If necessary, the UI (user menu window) displayed on the display unit 2700 may be changed.

If the reconnected apparatus is determined in step S4 to be of a compatible model, the process advances to step S6 to determine whether print process is performed using a DPOF file. If YES in step S6, the process advances to step S7 to transmit the file ID of the DPOF file to the PD printer 1000. In this case, "prtPID" information, "ImagePath" information, and "copyID" information described above are transmitted together with the file ID of the DPOF file, thereby designating a file subjected to the restart of print process using the DPOF file.

If the print process is not performed using DPOF file in step S6, i.e., each image file is to be designated and printed, the file IDs of image files except printed image files among the file IDs of image files to be printed are transmitted at once to the PD printer 1000 to execute printing. Note, as a print restart instruction, a print button is designated among the operation buttons of the DSC 3012 to send the "StartJob" instruction from the DSC 3012 to the PD printer 1000 and print process is restarted.

The PD printer 1000 notifies the DSC 3012 of the end of printing of each page by the "jobStatus" information (meaning the start of printing of the next page) sent from the PD printer 1000 at the start of the next page, or the "jobEndReason" information contained in the "deviceStatus" information for the final page. The DSC 3012 can, therefore, confirm the number of printed images. Whether the print process has been interrupted can be determined based on whether the number of images designated by a print instruction have been printed when images are printed one by one, or from the progress (the "prtPID" information, the "ImagePath" information, and the "copyID" information) in a DPOF file or whether the print process has been completed when the print process is based on the DPOF file.

When one image is printed on one page, the number of print paper sheets coincides with the number of images. When, however, a plurality of (N) images are laid out and printed on one paper sheet, the number of images to be printed does not coincide with the number of print paper sheets. The DSC 3012 must make the number of print paper sheets and the number of image data match with each other in accordance with the print mode.

When date print <datePrint> information 704 in the <jobConfig> information 720 in FIG. 7 is designated, the <date> information 710 contained in the <printInfo> information 721 is printed. When the date print <datePrint> information 704 in the <jobConfig> information 720 is not designated, date data is ignored and is not printed even if the <date> information 710 is contained in the <printInfo> information 721.

This can increase the degree of freedom of data contained in the <printInfo> information 721. A startJob command can be created by, e.g., directly pasting, to the <printInfo> information 721, image data and a date list which are used by another job.

Figure 10:
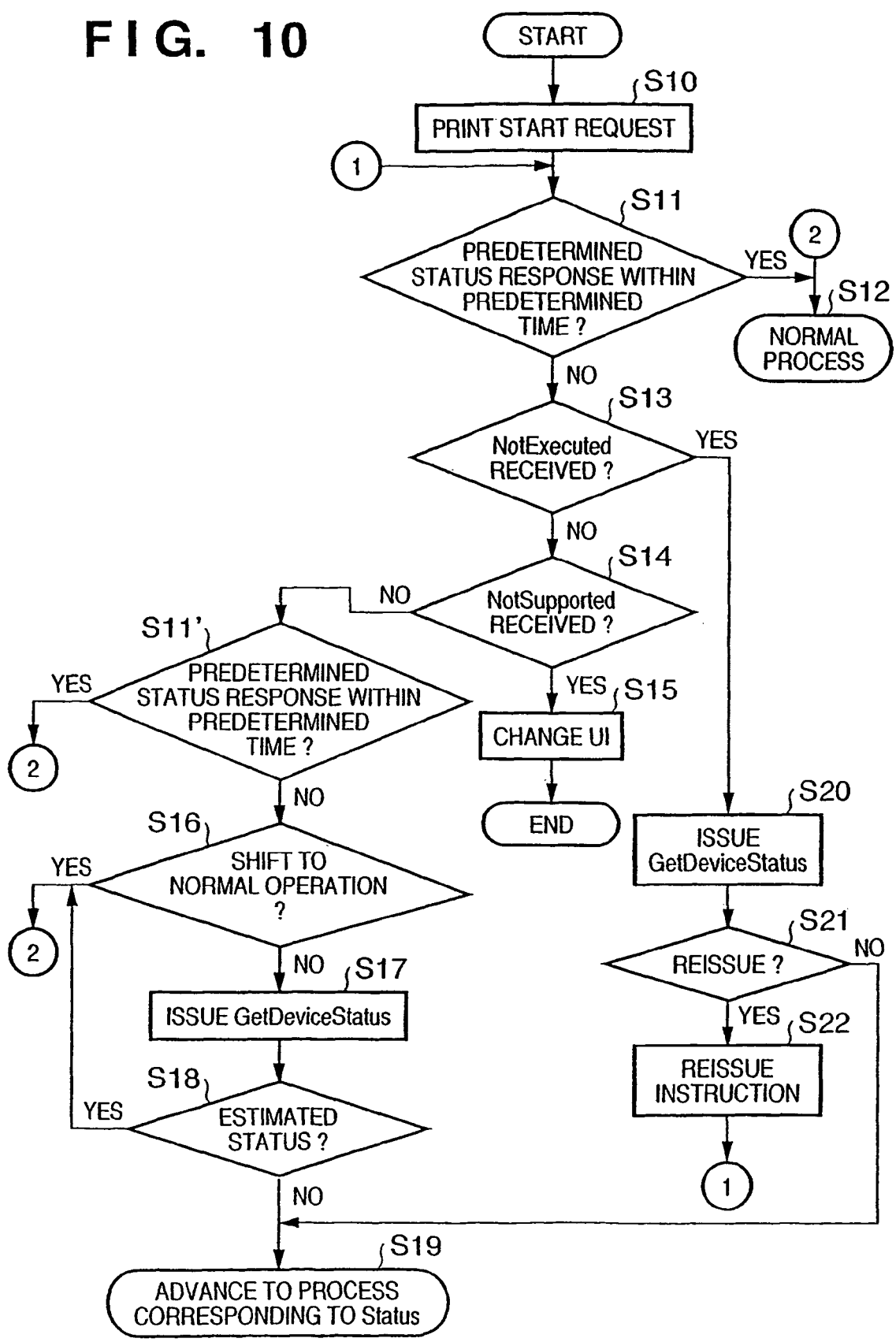
FIG. 10 is a flow chart for explaining a process by a DSC according to the embodiment.

FIG. 10 is a flow chart for explaining a process in a print system according to the first embodiment of the present invention.

In the embodiment, when the DSC 3012 issues any command to the PD printer 1000 and the status of the PD printer 1000 changes, the PD printer 1000 notifies the DSC 3012 of the status by the "NotifyDeviceStatus" information described above. However, when the state of the PD printer 1000 does not change or a response is delayed, the DSC 3012 determines (estimates) that a prospective status change has occurred in the PD printer 1000 by a previously issued command, and executes a corresponding process. To confirm the state of the PD printer 1000, the DSC 3012 issues a "GetDeviceStatus" instruction to the PD printer 1000, acquires information indicating the state of the PD printer 1000, and executes a process corresponding to the acquired status of the printer.

An example of this process will be explained with reference to the flow chart of FIG. 10.

In step S10, a print start request "StartJob" is issued to the PD printer 1000. The process advances to step S11 to determine whether a predetermined status response "NotifyDeviceStatus" is received from the PD printer 1000. If the PD printer 1000 is a product-type capable of accepting only one print job, newJobOK information of the NotifyDeviceStatus information indicating that the PD printer 1000 can accept the next print job should be "False" after issuing the print start request "startJob" to the PD printer 1000. If a normal response (the newJobOK information is "False") is received in step S11, the process advances to step S12 to wait until the "newJobOK" information changes to "True". Thereafter, a normal print process of issuing the next command or outputting image data or the like in accordance with a request from the PD printer 1000 is executed.

In step S13, it is determined whether the "NotExecuted" information indicating that the "StartJob" operation could not be executed has been received. If the "NotExecuted" information has been received, the process advances to step S20 to issue the "GetDeviceStatus" instruction to the PD printer 1000 and acquire the current status of the PD printer 1000. If this status reveals the reason why the instruction could not be executed, and the "StartJob" instruction can be reissued, a message to this effect is displayed on the UI of the display unit 2700 of the DSC 3012. After then, if the user designates reissuing of an instruction by using the button 3103, the process advances from step S21 to S22 to reissue to the PD printer 1000 the "StartJob" instruction which has not been executed. If no reissuing designation is input in step S21, the process advances from step S21 to step S19.

If no "NotExecuted" information has been received in step S13, the process advances to step S14 to determine whether the "NotSupported" information has been received. If the "NotSupported" information has been received, the process advances to step S15. In this case, the previously issued "StartJob" instruction is not supported by the PD printer 1000, and, for example, non-supported items (impossible designation) are displayed on the UI of the display unit 2700 so as to represent that the print instruction is not supported by the PD printer 1000.

The meaning of not supporting the "StartJob" instruction includes a case in which the PD printer 1000 does not support the "StartJob" instruction itself, and also a case in which the PD printer 1000 supports the "StartJob" instruction itself but does not support the currently issued "StartJob" instruction because an unsupported paper size or paper type is designated. In this case, the UI of the DSC 3012 is so reconstructed as to disable selection of an improper paper size or paper type (items to be set for print operation), similar to the above-described example. This can decrease the possibility of receiving a "NotSupported" indication again when a "StartJob" instruction is executed again to the PD printer 1000. Note, upon receiving the "NotSupported" information, a process of, e.g., confirming a paper size or paper type supported by the PD printer 1000 may be performed.

If no "NotSupported" information has been received in step S14, the process advances to step S11'. This step assumes that the response content is substantially "OK". If a predetermined status response is received in step S11', the process advances to step S12 to continue a normal operation. If no predetermined status information is received in step S11', the process advances to step S16 to determine whether to continue the operation as a normal operation. This may be displayed using the above-mentioned UI to allow the user to select the normal operation. If the process shifts to the normal operation, the process advances to step S12. If the user does not input any instruction and the process does not shift to the normal operation, the process advances to step S17 to request the status of the PD printer 1000 by using "GetDeviceStatus". The process advances to step S18, and the status of the PD printer 1000 is acquired and if the status is an ordinary one, this status is determined to be a normally estimated one, and the process advances to step S12. If another status is acquired, the process advances to step S19 to execute a process corresponding to the acquired status.

The reason why unestimated "NotExecuted" information has been sent back as a response in step S13 is that, for example, when a PC 3010 is connected to the PD printer 1000, a print instruction from the PC 3010 is received by the PD printer 1000 at almost the same time as a print start request from the DSC 3012 and a print process of print data from the PC 3010 is commenced. That is, since the DSC 3012 recognizes that the "newJobOK" information denotes the value "True" in advance on the basis of the NotifyDeviceStatus information issued by the PD printer 1000, the DSC 3012 issues a "StartJob" command. However, immediately when the "StartJob" command is issued, the "newJobOK" information denoting the value "False" is set, and the PD printer 1000 sends back "NotExecuted" information as a response. The DSC 3012 which has recognized that the "newJobOK" information denoting the value "True" receives the unestimated response "NotExecuted" from the PD printer 1000. The reason why no predetermined status information has been received in step S11 is that, for example, the PD printer 1000 is a product capable of accepting a plurality of print jobs and even after a print request "StartJob" is accepted, the "newJobOK" information of the "DeviceStatus" information is kept unchanged as "True", and thus the PD printer 1000 does not issue the "NotifyDeviceStatus" information to the DSC 3012. Also in this case, the DSC 3012 securely operates on the assumption that the "newJobOK" information denotes that value "False" until the state of the PD printer 1000 has been confirmed by the "GetDeviceStatus" instruction (because of the possibility of delaying issuing of the "NotifyDeviceStatus" information representing that the "newJobOK" information denotes the value "False" due to any cause).

The above description assumes that, even when a command from the DSC 3012 and a command from the PD printer 1000 are almost simultaneously issued, both the commands become effective. However, there may be also a direct print specification: "of almost simultaneously issued commands, a command from the DSC 3012 is preferentially processed, and issuing of a command from the PD printer 1000 is ignored and discarded". In this case, step S11 determines "whether a command issued from the PD printer 1000 has been received?". If YES in step S11, the process advances to step S13 via a step (not shown) of ignoring a command from the PD printer 1000; if no command is received from the printer 1000, the process directly advances to step S13.

In the above direct print specification, the discarded command of the PD printer 1000 may be reissued by the PD printer 1000. A case in which a print instruction from the PC 3010 is received at almost the same time as the "StartJob" instruction from the DSC 3012 and a print process for printing data from the PC 3010 is commenced will be exemplified. The DSC 3012, which has recognized in advance that the value of the "newJobOK" information is "True" in response to the issuance of the NotifyDeviceStatus information issued by the PD printer 1000 in advance, issues a "StartJob" instruction. At almost the same time, the PD printer 1000, which starts a print process for printing data from the PC 3010, changes so that the "newJobOK" information takes a value of "False". In order to notify the DSC 3012 of this, the PD printer 1000 issues "NotifyDeviceStatus" information to the DSC 3012. However, the "NotifyDeviceStatus" information issued by the PD printer 1000 is discarded, and the "StartJob" instruction issued by the DSC 3012 is preferentially processed. Since the PD printer 1000 has already changed the value of "newJobOK" information to "False", it sends back "NotExecuted" information in response to the "StartJob" instruction. At this time, the PD printer 1000 must reissue the "NotifyDeviceStatus" information in order to notify the DSC 3012 that the value of the "newJobOK" information is "False". At this time, if the DSC 3012 issues the next command, instructions (commands) are almost simultaneously issued from the two devices again.

Basically, the situation in which the two devices almost simultaneously issue commands and one of them is discarded may occur when criterion statuses used to issue commands from the two devices are different. In this case, the direct print process becomes very unstable and is in a dangerous state. Hence, the situation in which the two devices almost simultaneously issue commands is preferably avoided as much as possible. For this purpose, for example, when the DSC 3012 detects "issuing of a command from the PD printer 1000" in step S11, issuing of a "GetDeviceStatus" instruction may be inhibited in step S20 or S17 for a predetermined time period to wait for a command from the PD printer 1000.

Also in the PD printer 1000 as a partner of the direct print system, inhibition of issuing a command from the PD printer 1000 for a predetermined time period and waiting for a command from the DSC 3012 may be set. If, however, these predetermined inhibition time periods are equal, commands will be almost simultaneously issued from the two devices after the elapse of the predetermined time period. Considering this possibility, the predetermined time period may not be fixed and may be changed dynamically discontinuously or irregularly. Alternatively, the inhibition time period used when "issuing of a command by the PD printer 1000 is not detected" in step S11 may be used until "issuing of a command by the PD printer 1000 is detected" in step S11, and updated when "issuing of a command by the PD printer 1000 is detected" in step S11. As a method of changing the timing of issuing command, the issuing timing may be advanced. To prevent the two devices from changing to the same timing, the timing may be changed by a predetermined rule. For example, the timing change method may be set depending on the USB host or slave. Alternatively, both the DSC 3012 and PD printer 1000 may comprise means for generating random timing signals, and command issuing timings may be determined in accordance with the timing signals, respectively. As described above, the PD printer 1000 may also be set to a state in which issuing of a command from the PD printer 1000 is inhibited for a predetermined time period, thereby decreasing the possibility of almost simultaneously issuing commands from the two devices. Various modifications described above can also be applied.

A process of continuing printing from the DSC 3012 in the print system according to the embodiment and a process of interrupting print process will be described. Also in this case, the arrangement of the print system and those of the DSC 3012 and a PD printer 1000 are the same as those described above, and a description thereof will be omitted.

Figure 11:
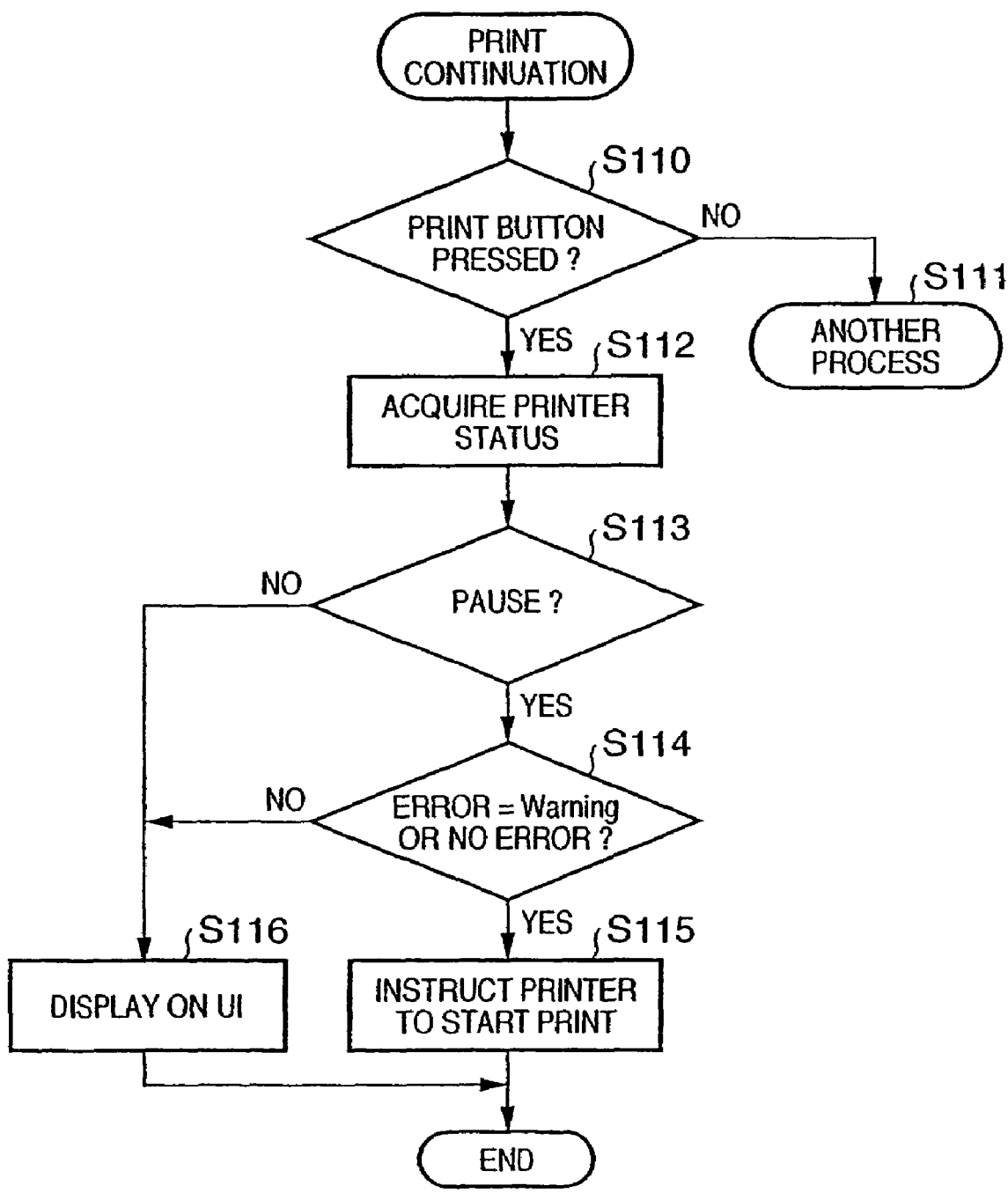
FIG. 11 is a flow chart for explaining a process accompanying button operation for continuing printing in a DSC according to the first embodiment.

FIG. 11 is a flow chart for explaining a print continuation process executed when a print process in the DSC 3012 according to the embodiment is interrupted and then executed upon designating a print button which designates the print start.

In step S110, it is determined whether the print button among operation buttons 3103 of the DSC 3012 has been designated. If NO in step S110, the process advances to step S111 to execute another process such as a process corresponding to a designated button or to wait for an instruction inputted with a button. If the print button has been designated, the process advances to step S112. A "GetDeviceStatus" instruction is issued to the PD printer 1000 to request status information of the PD printer 1000 and acquire status information sent from the PD printer 1000 in response to the request. The process advances to step S113 to determine on the basis of the acquired status information whether the status of the PD printer 1000 is "pause". If YES in step S113, the process advances to step S114 to determine whether an error has occurred and a "Warning" is set (e.g., a cable is disconnected), or it is determined that no error has occurred. If YES in step S114, the restart of a print process is determined to be possible (because the status from the PD printer 1000 has been received). The process advances to step S115 to instruct the PD printer 1000 to restart the print process (e.g., transmit a "ContinueJob" instruction).

If no pause state is set in step S113 or another error has occurred in step S114, the restart of the print process is determined to be impossible, and a message to this effect is displayed on the UI of the display unit 2700. In this case, for example, a message is displayed on the display unit 2700 to notify the user that the print process cannot restart, and/or selection of the print button is disabled. Wasteful effort pressing the print button by the user can be avoided by acquiring the statue of the PD printer 1000 before pressing the print button is determined in step S110, and notifying the user whether ON/OFF of the print button is effective.

Figure 12:
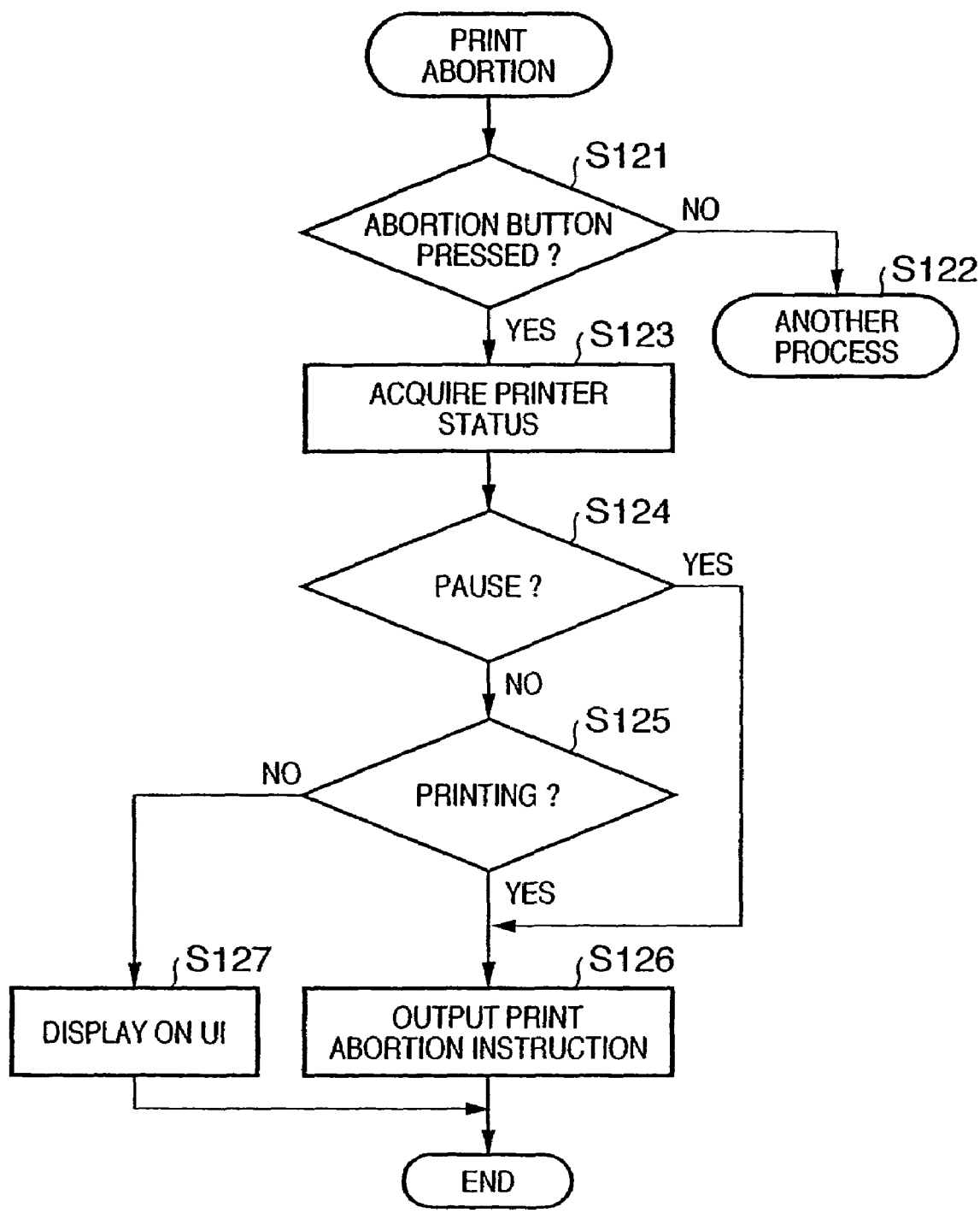
FIG. 12 is a flow chart for explaining a process accompanying button operation for aborting printing in the DSC according to the first embodiment.

FIG. 12 is a flow chart for explaining a print abortion process executed upon designating a print abortion button which designates abortion of a print process in the DSC 3012 according to the embodiment.

In step S121, it is determined whether an abortion button among the operation buttons 3103 of the DSC 3012 has been designated. If NO in step S121, the process advances to step S122 to execute another process, such as a process corresponding to a designated button, or waiting for the inputting of another instruction in response to the use of a button. If the abortion button has been designated (pressed), the process advances to step S123. A "GetDeviceStatus" instruction is issued to the PD printer 1000 to request current status information of the PD printer 1000 and acquire status information sent from the PD printer 1000 in response to the request. The process advances to step S124 to determine on the basis of the acquired status information whether the status of the PD printer 1000 is "pause". If YES in step S124, the process advances to step S126; if NO, to step S125 to determine whether printing progresses. If YES in step S125, abortion of the print process is determined to be possible, and the process advances to step S126 to instruct the PD printer 1000 to abort the print process (transmit "AbortJob").

If NO in step S125, abortion of the print process is determined to be impossible, and a message to this effect is displayed on the UI of the display unit 2700. In this case, for example, a message is displayed on the display unit 2700 to notify the user that printing cannot be aborted, and/or selection of the abortion button is disabled. Wasteful effort pressing the abortion button by the user can be avoided by acquiring the statue of the PD printer 1000 before pressing of the abortion button is determined in step S121, and notifying the user whether pressing of the abortion button is effective.

Second Embodiment

The above described embodiment is mainly explained for a processing in the DSC 3012, but the second embodiment will be explained for an operation in a case where the PD printer 1000 acquires image data from the DSC 3012. The hardware structures of the DSC 3012 and the PD printer 1000 are the same as those in the first embodiment, so the descriptions of the structures will be omitted.

Figure 13:
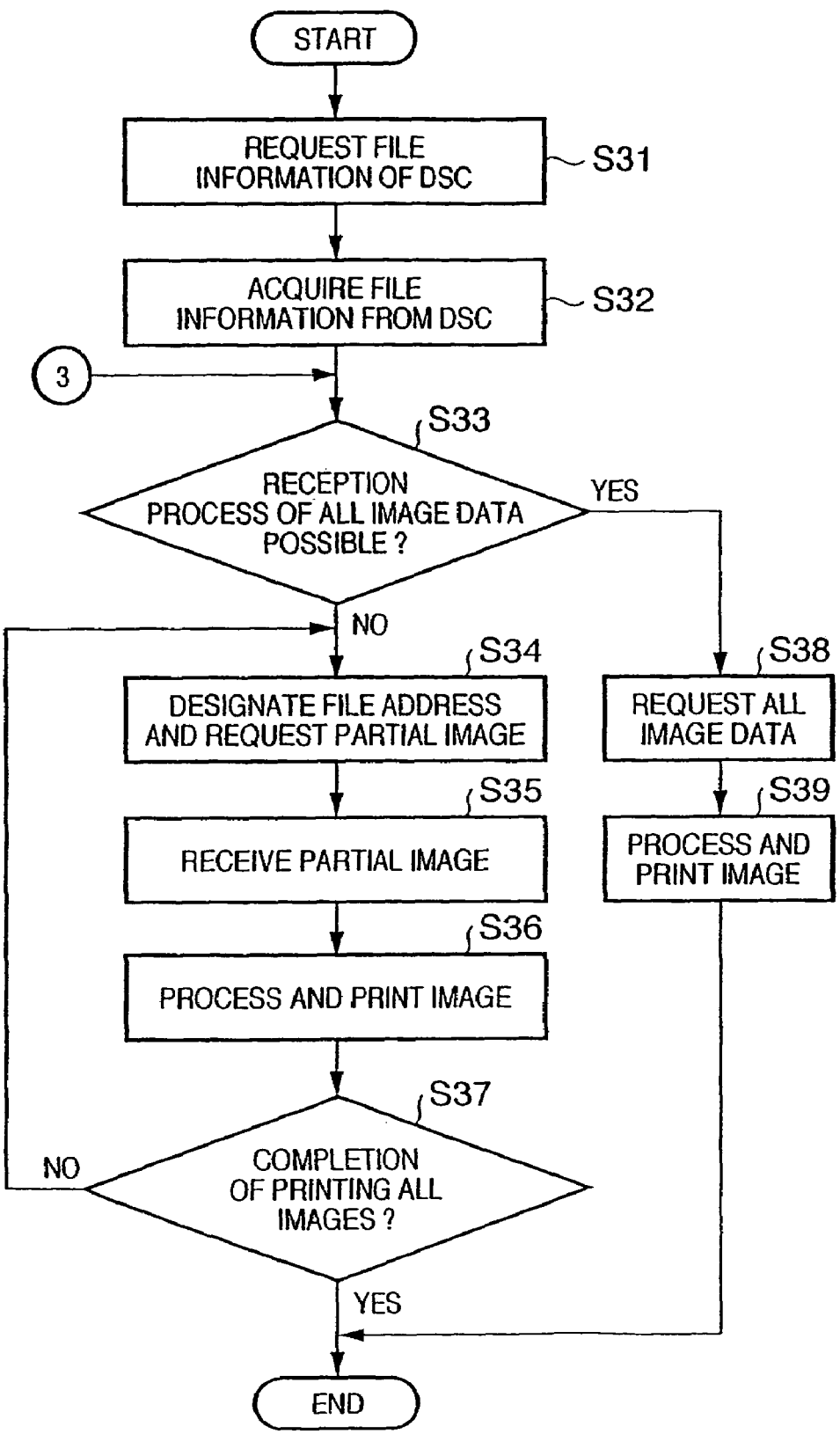
FIG. 13 is a flow chart for explaining a process by a PD printer according to a second embodiment.

FIG. 13 is a flow chart for explaining an image data acquisition process in the PD printer 1000 according to the second embodiment of the present invention. A program which executes this process is stored in the program memory 3003a, and executed under the control of the DSP 3002.

This process starts when a print request ("StartJob") is sent from the DSC 3012 to designate the start of a print process. In step S31, the "GetFileInfo" instruction is sent to the DSC 3012 to request information on an image file desired by the DSC 3012. In step S32, when information (file size, attribute, or the like) on the image file is sent from the DSC 3012, an item which is contained in the information and represents the file capacity is acquired. The process advances to step S33 to determine whether the entire image file can be received and processed at once. This is determined on the basis of, e.g., the memory capacity of a free area in the memory 3003 of the PD printer 1000. If reception of all image data at once is determined to be impossible, the process advances to step S34 to read out the image file. A start address and read amount are designated to request partial image data of the image file. This is performed using the "GetPartialFile" instruction. The DSC 3012 reads out the designated partial image data from the image file in accordance with the start address and read amount, and transmits the partial image data to the PD printer 1000. The PD printer 1000, which has received the partial image data in step S35, processes and prints the partial image data in step S36. The process advances to step S37 to determine whether all image data of the image file have been printed. If NO in step S37, the process returns to step S34 to request the next partial image data. This process is repetitively executed until the entire image file designated in step S32 has been received and printed.

If it is determined in step S33 that image data of the image file can be received and processed at once, the process advances to step S38 to request all the data of the image file of the DSC 3012. In step S39, all the image data of the image file sent from the DSC 3012 on the basis of the request are received and printed.

Figure 14:
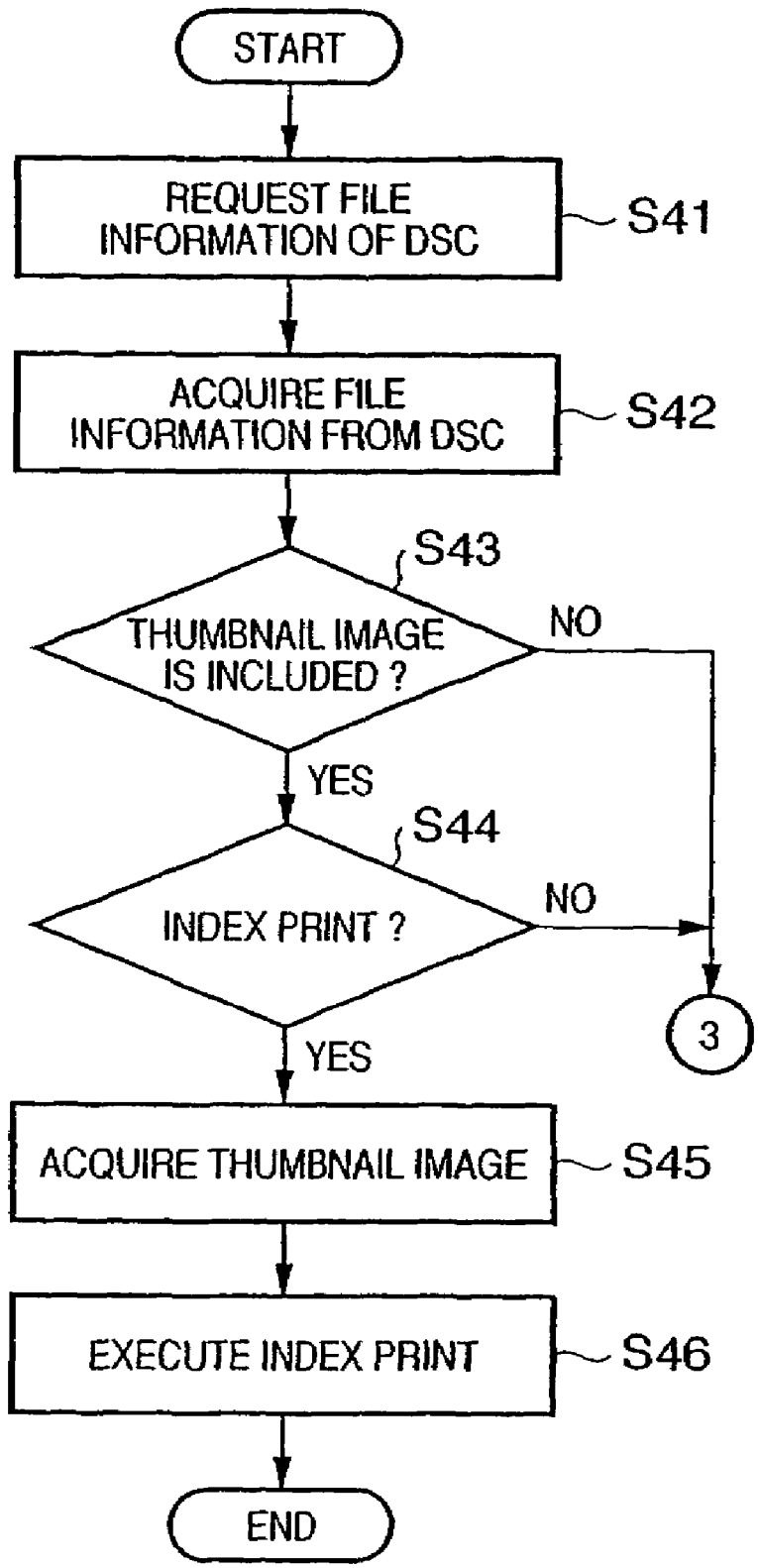
FIG. 14 is a flow chart for explaining another process by the PD printer according to the second embodiment.

FIG. 14 is a flow chart for explaining another example of the image data acquisition process in the PD printer 1000 according to the second embodiment of the present invention. A program which executes this process is stored in the program memory 3003a, and executed under the control of the DSP 3002.

This process starts when a print request ("StartJob") is sent from the DSC 3012 to designate the start of a print process. In step S41, the "GetFileInfo" instruction is sent to the DSC 3012 to request information on an image file designated by the DSC 3012. In step S42, if information on the image file is sent from the DSC 3012, the process advances to step S43 to determine whether the image file contains thumbnail images (index images). If the image file contains thumbnail images, the process advances to step S44 to determine whether index print is designated using the control unit 1010. If index print is designated, the process advances to step S45 to request the thumbnail image data of the DSC 3012 (issue "GetThumb") and acquire the data. The process advances to step S46 to execute index print on the basis of the acquired thumbnail image data.

If the image file does not contain any thumbnail image in step S43 or no index print is designated in step S44, the process advances to step S33 (FIG. 13) to execute the above-described image print process.

In this fashion, according to the second embodiment, the image data amount acquired at once from the DSC 3012 can be changed and input from the DSC 3012 in accordance with the memory capacity and process performance of the PD printer 1000.

It can be detected in advance that a thumbnail image has already been stored in the image file of the DSC 3012. When index printing is designated in the PD printer 1000, a thumbnail image creation process in the PD printer 1000 can be omitted. Thus, a thumbnail image (index image) can be quickly printed.

The present invention may be applied to a system including a plurality of devices (e.g., a host computer, interface device, reader, and printer) or an apparatus (e.g., a copying machine or facsimile apparatus) formed from a single device.

The object of the present invention is also achieved when a storage medium (or recording medium) which stores software program codes for realizing the functions of the above-described embodiments (processes performed on the camera side and various print processes performed on the printer side) is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the present invention includes a case in which the functions of the above-described embodiments are realized when an OS (Operating System) or the like running on the computer performs part or all of actual processing on the basis of the instructions of the program codes.

Furthermore, the present invention includes a case in which, after the program codes read out from the storage medium are written in the memory of a function expansion card inserted into the computer or the memory of a function expansion unit connected to the computer, the CPU of the function expansion card or function expansion unit performs part or all of actual processing on the basis of the instructions of the program codes and thereby realizes the functions of the above-described embodiments.

As has been described above, according to the embodiments, when a print process in the PD printer is interrupted by disconnecting a cable which connects the DSC and the PD printer, and printing can be restarted by connecting the cable again, the print process can be reliably restarted to print.

Image data resent from the DSC to the PD printer is changed at the restart of the print operation between print processing based on a DPOF file and print processing of image data sequentially transmitted from the DSC to the PD printer. In either case, print operation can be reliably restarted.

When the DSC according to the embodiments issues a command such as StartJob or AbortJob to the printer, the DSC estimates that a predetermined state has been set even without any response from the printer, and can decide the next operation. The DSC further issues a command for confirming the status to the printer, and can identify the current state (status) of the printer.

When the printer sends back a specific status as a response to the DSC, the DSC commences a corresponding process. For example, for "NotExecuted" or "NotSupported", the DSC issues a command which inquires of the state of the printer for the former command, and decides the next command to be issued on the basis of the response from the printer. For the latter command, a previously issued command is not supported by the printer, and thus the DSC executes a process of, e.g., changing a UI displayed on the display unit so as not to subsequently issue the same command. This can prevent resending of an unwanted command to the printer.

According to the embodiments, the printer can adjust the image data amount to be acquired at once from the DSC in accordance with the memory capacity and/or process performance of the printer. Image data can be loaded, processed, and printed by the printer.

The present invention is not limited to the above embodiments and various changes and modifications can be made within the spirit and scope of the present invention. Therefore, to apprise the public of the scope of the present invention, the following claims are made.

The invention claimed is:

1. An image supply device used in a recording system in which the image supply device and a recording apparatus directly communicate with each other via a communication interface, and image data is transmitted from the image supply device to the recording apparatus and recorded, comprising:
    a determination unit that determines whether the recording apparatus is of a type capable of restarting recording in a case where a recording process by the recording apparatus is interrupted;
    an instruction unit that instructs the recording apparatus to restart recording in a case where the determination unit determines that the type of the recording apparatus is the type capable of restarting the recording process; and
    a control unit that controls said image supply device to designate an image file to be recorded subsequent to the interruption of the recording process of image data in a case where the instruction unit instructs the restart of the recording process,
    wherein the determination unit determines that the type of the recording apparatus is a type capable of restarting recording in a case where at least one of a predetermined model name, a manufacturer name, and a vendor name of the recording apparatus coincides, respectively, with one of a model name, a manufacturer name, and a vendor name of the recording apparatus whose recording process has been interrupted.

2. The image supply device according to claim 1,
    wherein the recording process includes a first recording process based on a DPOF file and a second recording process performed by designating each image file to be recorded, and
    wherein the control unit designates recording of the image file to be recorded subsequent to the recording of a page of the DPOF file for the first recording process in the event recording occurs according to the first recording process, and designates recording of the image file to be recorded subsequent to the recording of an image file that has occurred prior to the interruption of the recording process for the second recording process in the event recording occurs according to the second recording process.

3. The image supply device according to claim 1, wherein the communication interface includes a USB port.

4. The image supply device according to claim 1, wherein the image supply device includes a digital camera.

5. A device according to claim 1, wherein the control unit comprises:
    a first record control unit that transmits from the image supply device to the recording apparatus a recording instruction instructing the performing of the recording process that is interrupted, transmits a recording status of the recording process to the recording apparatus, and controls the recording apparatus to perform a recording process for recording image data subsequent to the interruption of the interrupted recording process; and a second record control unit that generates and transmits to the recording apparatus a new recording instruction based on a recording instruction of the recording process that is interrupted, generates and transmits a recording status of the recording process to the recording apparatus, and controls the recording apparatus to perform a recording process to record image data subsequent to the interruption of the interrupted recording process.

6. A recording method for a recording system in which an image supply device and a recording apparatus are directly connected via a communication interface, and image data is transmitted from the image supply device to the recording apparatus and recorded, said method comprising the steps of:

determining whether the recording apparatus is of a type capable of restarting recording in a case where a recording process by the recording apparatus is interrupted;

instructing the recording apparatus with the image supply device to restart the recording process via a recording restart instruction, in a case where the type of the recording apparatus is determined to be the type capable of restarting the recording process in said determining step; and instructing the recording apparatus with the image supply device to designate an image file to be recorded via a recording operation subsequent to the interruption of recording of the image data, wherein the determining step determines that the type of the recording apparatus is the type capable of restarting recording in a case where at least one of a predetermined model name, a manufacturer name, and a vendor name of the recording apparatus coincides, respectively, with one of a model name, a manufacturer name, and a vendor name of the recording apparatus whose recording process has been interrupted.

7. The recording method according to claim 6, wherein the recording process includes a first recording process based on a DPOF file and a second recording process performed by designating each image file to be recorded, and wherein the step of instructing of the recording apparatus to designate an image file comprises the step of designating recording of the image file to be recorded subsequent to recording of a page of the DPOF file for the first recording process in the event recording occurs according to the first recording process, and designating recording of the image file to be printed subsequent to the recording of an image file that has occurred prior to the interruption of the recording process for the second recording process in the event recording occurs according to the second recording process.

8. A control method for a recording system in which an image supply device and a recording apparatus are directly connected via a communication interface, and image data is transmitted from the image supply device to the recording apparatus and recorded, the method comprising:

a determination step of determining whether the recording apparatus connected to the image supply device is of a type capable of restarting a recording process, in a case where the recording process is interrupted;

a first step of causing the image supply device to instruct the recording apparatus to restart the recording process via a recording restart instruction in a case where the type of the recording apparatus is determined in said determination step to be the type capable of restarting the recording process; and a second step of causing the image supply device to instruct the recording apparatus to designate an image file to be recorded subsequent to the interruption of the recording process of recording image data, wherein the determination step determines that the type of the recording apparatus is the type capable of restarting recording, in a case where at least one of a predetermined model name, a manufacturer name, and a vendor name of the recording apparatus coincides, respectively, with one of a model name, a manufacturer name, and a vendor name of the recording apparatus whose recording process has been interrupted.

9. A control method according to claim 8, wherein the second step comprises:

a first record control step of transmitting a recording instruction of the recording process that is interrupted to the recording apparatus, transmitting a recording status of the recording process to the recording apparatus, and controlling the recording apparatus to perform a recording process for recording image data subsequent to the interruption of the interrupted recording process; and a second record control step of generating and transmitting to the recording apparatus a new recording instruction based on a recording instruction of the recording process that is interrupted, generating and transmitting a recording status of the recording process to the recording apparatus, and controlling the recording apparatus to perform a recording process to record image data subsequent to the interruption of the interrupted recording process.

* * * * *